United States Patent
Kretschmann et al.

(10) Patent No.: US 11,358,419 B2
(45) Date of Patent: Jun. 14, 2022

(54) METHOD FOR DETECTING WHEEL UNITS OF A VEHICLE AND WHEEL MOUNTING POSITIONS BELONGING TO THE WHEEL UNITS, AND A WHEEL INFORMATION SYSTEM

(71) Applicant: Continental Automotive GmbH, Hannover (DE)

(72) Inventors: Matthias Kretschmann, Wenzenbach (DE); Parthiv Dharamshi, Regensburg (DE); Michael Löffler, Zeitlarn (DE); Jean-Philippe Boisset, Montauban (FR)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 17/254,161

(22) PCT Filed: Jun. 18, 2019

(86) PCT No.: PCT/EP2019/066105
§ 371 (c)(1),
(2) Date: Dec. 18, 2020

(87) PCT Pub. No.: WO2019/243374
PCT Pub. Date: Dec. 26, 2019

(65) Prior Publication Data
US 2021/0268849 A1  Sep. 2, 2021

(30) Foreign Application Priority Data

Jun. 20, 2018  (GB) ..................... 1810137

(51) Int. Cl.
*B60C 23/04* (2006.01)
(52) U.S. Cl.
CPC ...... *B60C 23/0416* (2013.01); *B60C 23/0437* (2013.01); *B60C 23/0479* (2013.01)

(58) Field of Classification Search
CPC ........... B60C 23/0416; B60C 23/0437; B60C 23/0479
See application file for complete search history.

(56) References Cited

U.S. PATENT DOCUMENTS 9,259,980 B2   2/2016 Deniau et al.
2007/0052527 A1   3/2007 Song et al.
(Continued)

FOREIGN PATENT DOCUMENTS

CN   102012506 A   4/2011
CN   102765304 A   11/2012
(Continued)

OTHER PUBLICATIONS

Search Report dated Nov. 16, 2018 from corresponding GB Patent Application No. GB1810137.8.
(Continued)

*Primary Examiner* — Travis R Hunnings

(57) ABSTRACT

A method for detecting wheel units mounted at wheels of a vehicle and for detecting wheel mounting positions belonging to each of the wheel units is disclosed. The method comprises the steps of: positioning a mobile communication device at a predetermined start position with respect to the vehicle, moving the mobile communication device from the start position along a path around the vehicle, receiving RF signals from the wheel units and measuring the RF signal strengths thereof by the mobile communication device when moving along the path around the vehicle, performing an analysis of variations of the measured RF signal strengths of the received RF signals depending on the position of the mobile communication device along the path, identifying the wheel units and identifying the wheel mounting positions based on a result of the analysis.

12 Claims, 4 Drawing Sheets

(56) References Cited

U.S. PATENT DOCUMENTS

Figure 1:
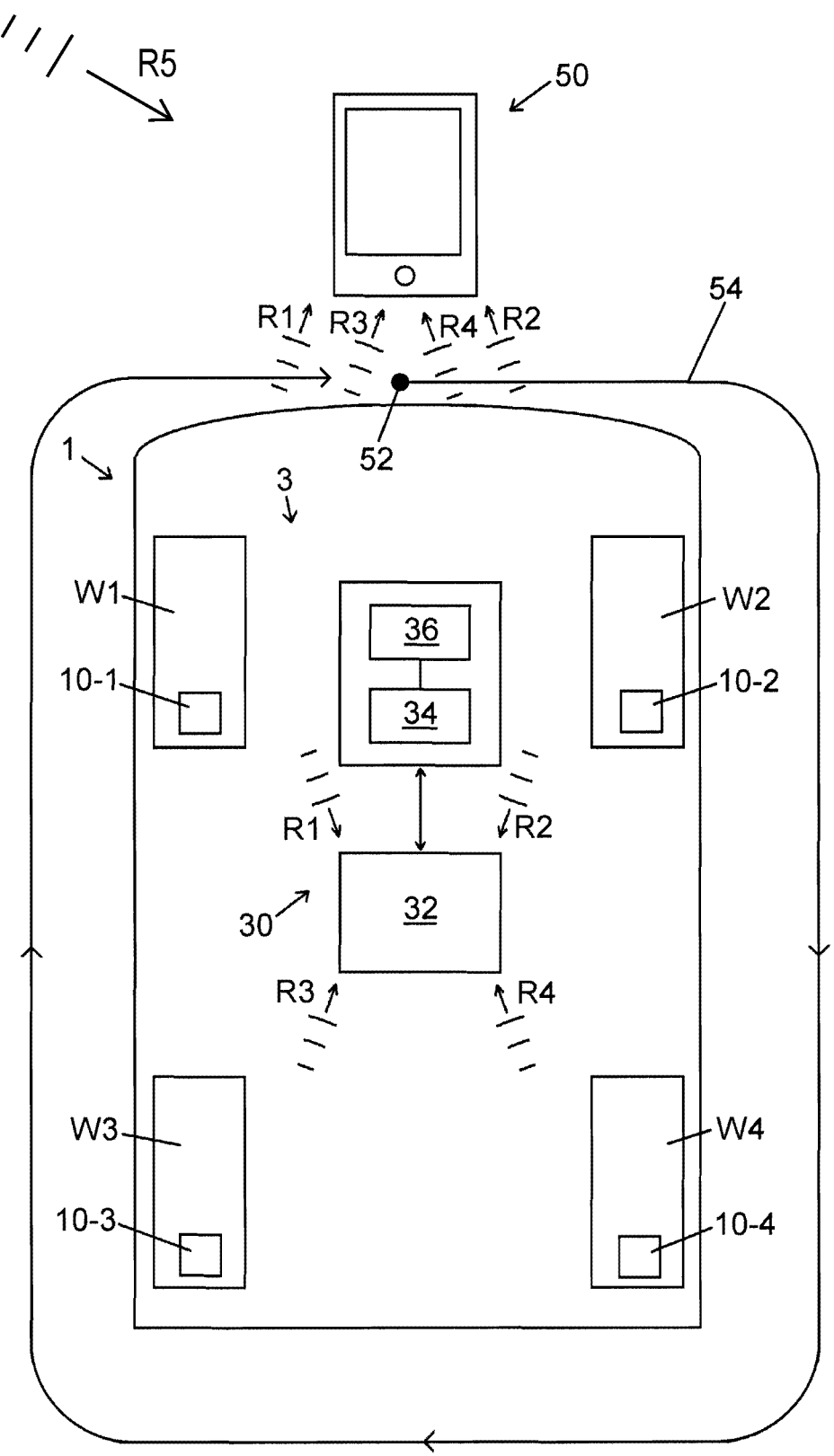

| | | |
|---|---|---|
| 2008/0143507 A1 | 6/2008 | Cotton et al. |
| 2008/0164988 A1* | 7/2008 | DeKeuster .......... B60C 23/0479 340/442 |
| 2010/0274441 A1 | 10/2010 | Carresjo |
| 2011/0057817 A1 | 3/2011 | Proefke et al. |
| 2012/0249320 A1 | 10/2012 | Bagozzi et al. |
| 2015/0054640 A1 | 2/2015 | Huang et al. |
| 2015/0343858 A1 | 12/2015 | Yu et al. |
| 2015/0352912 A1 | 12/2015 | Lehmann et al. |
| 2016/0259032 A1* | 9/2016 | Hehn .................... G01S 5/0289 |
| 2017/0032159 A1* | 2/2017 | Troy .................. G06K 7/10009 |
| 2018/0086306 A1 | 3/2018 | Schmotzer et al. |
| 2018/0097884 A1* | 4/2018 | Terwilliger ............. H04L 67/24 |
| 2018/0304702 A1 | 10/2018 | Urano et al. |
| 2019/0084359 A1* | 3/2019 | Hassani ................. H04B 17/27 |
| 2019/0126694 A1* | 5/2019 | Stewart ................ B60C 23/007 |

FOREIGN PATENT DOCUMENTS

| | | |
|---|---|---|
| CN | 107150560 A | 9/2017 |
| CN | 1078867261 A | 4/2018 |
| DE | 102006038923 A1 | 3/2007 |
| EP | 1702769 A2 | 9/2006 |
| GB | 8312036 | 6/1983 |
| JP | 2012201332 A | 10/2012 |
| WO | 2017078040 A1 | 5/2017 |

OTHER PUBLICATIONS

International Search Report and Written Opinion dated Aug. 21, 2019 from corresponding International Patent Application No. PCT/EP2019/066105.

First Office Action (translated and original), dated Feb. 25, 2022 from corresponding Chinese patent application No. 201980041457.8.

* cited by examiner

METHOD FOR DETECTING WHEEL UNITS OF A VEHICLE AND WHEEL MOUNTING POSITIONS BELONGING TO THE WHEEL UNITS, AND A WHEEL INFORMATION SYSTEM

A method for detecting wheel units of a vehicle and wheel mounting positions belonging to the wheel units, and a wheel information system The present invention relates to the field of wheel information systems in vehicles.

Such a system typically comprises wheel units, i.e. electronic modules that are placed at one or more wheels of the respective vehicle and are configured to send RF signals, and a receiver that is placed in the vehicle and is suitable for receiving the RF signals from the wheel units.

The wheel units may be mounted e.g. inside a respective tire of the wheel and may be suitable for measuring a tire pressure, a tire temperature, an acceleration and other operational parameters of the respective wheel and for communicating resulting wheel information together with an identification (e.g. a numerical ID code) wirelessly via RF communication to the vehicle-based receiver.

In particular, the present invention relates to a method and a system for detecting wheel units.

In such methods and systems, it is a key task of the receiver (including processing means for further processing of the received wheel information) to detect or identify which of the identifications received from a plurality of wheel units belong to the vehicle of interest (e.g. if there are several vehicles in the surrounding), and moreover, at which of a plurality of wheel mounting positions (e.g. front left, front right, rear left, rear right) of this vehicle the respective wheel units are mounted.

The former task is typically called "learning", while the latter is typically called "localization".

Both tasks (learning and localization) have already been addressed for cases, in which the receiver for the RF signals is arranged inside the vehicle and has access to information provided on a data communication bus system of the vehicle. In this case, wheel information communicated via RF communication to the receiver can be correlated with operational parameters of the respective vehicle, e.g. vehicle speed or rotational speeds of the wheels measured by vehicle-based sensor means, e.g. so-called "tick information" from wheel speed sensors arranged at each wheel of the vehicle.

Then, it is possible to statistically determine whether or not a particular wheel unit (identified by its identification) belongs to the vehicle or not (learning), and moreover, at which of the wheel mounting positions of the vehicle it is located (localization).

As such solutions require a vehicle-based receiver with access to additional operational parameters detected by on-board sensor means, the above mentioned learning and localization may not be achieved without fulfilling these requirements. With the rise of so-called smart devices (e.g. PDAs, smartphones, tablet PCs, wearables etc.) equipped with RF communication technology as e.g. Bluetooth communication technology, the opportunity arises to process information stored in and/or detected or measured by the wheel units in off-vehicle environments, e.g. in an automobile repair shop or as a functionality offered to a user of the vehicle.

Although such mobile communication devices (as e.g. in particular said smart devices) may be suitable for bidirectional communication with wheel units, the tasks of achieving information about which wheel unit (identified by its identification) belongs to the respective vehicle (learning) and where each of these wheel units is located at the respective vehicle (localization) remain.

It is therefore an object of the present invention to provide a solution for the above mentioned tasks when using a mobile communication device for processing information stored in wheel units and/or provided by wheel units each mounted at one of a plurality of wheels of a vehicle.

According to a first aspect of the invention, a method for detecting wheel units each mounted at one of a plurality of wheels of a vehicle and each having a wheel unit communication means suitable for sending an RF signal including a wheel information of the respective wheel and an identification of the respective wheel unit, wherein each wheel is mounted at one of a plurality of predetermined wheel mounting positions of the vehicle, and for detecting wheel mounting positions belonging to each of the wheel units comprises the steps of:

a) positioning a mobile communication device suitable for receiving the RF signals from the wheel units and for measuring an RF signal strength of the received RF signals at a predetermined start position with respect to the vehicle, b) moving the mobile communication device from the start position along a path around the vehicle, c) receiving the RF signals from the wheel units and measuring the RF signal strengths of the received RF signals by the mobile communication device when moving along the path around the vehicle, d) performing an analysis of variations of the measured RF signal strengths of the received RF signals depending on the position of the mobile communication device along the path, e) identifying the wheel units mounted at the wheels of the vehicle and identifying the wheel mounting positions belonging to these wheel units based on a result of the analysis.

With this method it is advantageously possible to identify the wheel units mounted at the vehicle and to identify the respective wheel mounting positions by using the mobile communication device, as e.g. a smartphone or a similar device (e.g. a PDA, a tablet PC, a wearable computer) equipped with a suitable mobile device RF communication means, in particular e.g. a Bluetooth means and a suitable computer program (for example a so-called App) executed on the mobile communication device.

The expression "suitable for" is to be read as "adapted to" or "configured to" throughout the specification.

Preferably, the wheel units mounted at the wheels of the respective vehicle are components which, together with an RF receiver arranged in the vehicle, constitute a wheel information system. This wheel information system may in particular be a tire information system (TIS), a tire pressure monitoring system (TPMS), or a system combining functionalities of a TIS and a TPMS.

In a TIS, the wheel units are suitable for storing wheel information comprising information about the respective wheel, e.g. about a rim of the wheel (e.g. rim diameter, rim width etc.) and/or a tire of the wheel (e.g. tire diameter, tire width, tire type, tire manufacturing date etc.), which information is irrespective of an actual operation of the wheel.

In a TPMS, the wheel units are suitable for providing wheel information comprising information about at least a pressure in a tire of the respective wheel.

The pressure is an example for an operational parameter of the wheel, which means a parameter not describing a property of the wheel as such, but rather a parameter which may vary during the operation of the wheel, i.e. depending on the momentary operation.

Other examples of operational parameters of a wheel are a temperature (e.g. a tire temperature inside a tire of the wheel) and an acceleration (at the location of the wheel unit). By measuring the acceleration, for example the momentary rotational position and/or rotational speed of the respective wheel may be determined.

In an embodiment, the wheel units are components of a wheel information system of the vehicle and are suitable for communicating at least one operational parameter of the respective wheel via RF communication to a vehicle-based receiver of the vehicle.

In an embodiment, the vehicle is a passenger car or a lorry.

In particular, the method described above can be employed for a four-wheeled car (e.g. a passenger car) having wheel mounting positions "front left", "front right", "rear left" and "rear right" (with respect to a body of the vehicle).

In particular in case of a lorry, the wheels of the vehicle can also be mounted on more than two axles and/or the vehicle can have more than two wheels at a particular axle.

In any case, each wheel unit communication means can send an RF signal and the mobile communication device can receive the RF signals sent from the plurality of wheel units. However, in a preferred embodiment, the wheel unit communication means and/or the mobile communication device is suitable for bidirectional RF communication, i.e. can send and receive RF signals.

In an embodiment, the predetermined start position in step a) is close to a wheel of the plurality of wheels of the vehicle. For example, a distance of the predetermined start position in step a) to a wheel of the plurality of wheels of the vehicle is below a predetermined threshold.

Advantageously, this can improve the reliability of the method, because such a start position can be e.g. taken into account in an algorithm used in step e). In particular, it can be foreseen for a certain type of vehicle, to always choose the start position close to a defined or predetermined wheel. For example, for a four-wheeled vehicle, it may be foreseen to choose the start position close to the wheel at the wheel mounting position "front right" (or another one of the remaining three wheel mounting positions).

In an embodiment, the predetermined start position in step a) is close to a face or side of a plurality of faces or sides of the vehicle. For example, a distance of the predetermined start position in step a) to a face or side of a plurality of faces or sides of the vehicle is below a predetermined threshold.

Advantageously, also this can improve the reliability of the method. In particular, it can be foreseen to always choose the same face or side (e.g. "front face", "right face" etc.).

In an embodiment, the positioning of the mobile communication device at the predetermined start position in step a) is communicated to the mobile communication device by a corresponding user input to the mobile communication device.

To this end, the mobile communication device may be e.g. suitable for presenting a predetermined selection of possible start positions to a user, who then can confirm a particular one of the presented start positions, when the user carrying the mobile communication device has reached the start position (step a) and wants to proceed with step b).

Such selection may be presented e.g. in form of a plurality of softkeys on a touch-sensitive screen of the mobile communication device, wherein each softkey is e.g. assigned to one of the possible start positions. The positions may be specified e.g. as "front face", "middle of front face", "rear face", "wheel front right", "rear left corner" etc. In this case, the user can choose any of the presented possible start positions and confirm the chosen start position by e.g. pressing an assigned softkey.

In an embodiment, the positioning of the mobile communication device at one or more particular positions in course of step b) is communicated to the mobile communication device by one or more corresponding user inputs to the mobile communication device.

To this end, for example a user carrying the mobile communication device and walking around the vehicle to accomplish step b) can confirm particular positions e.g. by means of pressing softkeys on a touchscreen of the mobile communication device.

In an embodiment, the mobile communication device is suitable for presenting a predetermined selection of position indications, from which the user can confirm a particular momentary position of the mobile communication device in course of step a) and step b).

Such position indications may in particular be related to faces or sides of a body of the vehicle (e.g. "middle of front face", "middle of right face", "middle of rear face" etc.) and/or corners of the vehicle's body (e.g. "front right corner", "rear right corner" etc.) and/or the wheels of the vehicle (e.g. "wheel front right", "wheel rear right" etc.).

In an embodiment, the mobile communication device comprises position sensor means for providing positional information about the position of the mobile communication device, wherein the method further comprises positional tracking based on the positional information by the mobile communication device when moving along the path around the vehicle.

This embodiment may advantageously be combined with the embodiment in which the positioning of the mobile communication device at the predetermined start position is communicated to the mobile communication device by a corresponding user input. In particular, in this case, the position of the mobile communication device along the path, which has to be used in step d) can be detected e.g. solely by the above mentioned positional tracking realized by the mobile communication device itself. In this case, user inputs during step b) can be advantageously omitted.

In an embodiment, the mobile communication device comprises telephone and/or computer functionalities.

In an embodiment, the mobile communication device is a smartphone. In another embodiment, the mobile communication device is a PDA or a tablet PC. In another embodiment, the mobile communication device is a wearable PC (e.g. wearable at a wrist of a user, for example a smartwatch).

In a preferred embodiment, the mobile communication device is suitable for bidirectional RF communication, e.g. according to the Bluetooth standard.

In an embodiment, the analysis in step d) comprises an evaluation of a shape and/or a sharpness of peaks of the path-dependent measured signal strengths.

The shape and the sharpness of such peaks depends on the specific path around the vehicle used in step b), so that such information about the path is very useful for accomplishing step e).

In an embodiment, the path used in step b) passes close to each of the wheel mounting positions of the vehicle. For example, in case of a four-wheeled passenger car that is substantially rectangular in top view, the path can be advantageously foreseen as a substantially rectangular path passing close to the front, rear and side faces of a vehicle's body (e.g. in a distance less than 1 m from the vehicle's body). In this case, relatively sharp peaks can be expected in the path-dependent measured signal strengths.

In an embodiment, the analysis in step d) comprises an evaluation of peak positions of peaks of the path-dependent measured signal strengths.

The peak positions depend on the specific path around the vehicle, wherein the order of peaks corresponds to the order of the wheel mounting positions at which the mobile communication device passes when moving around the vehicle in step b). Again, the knowledge about the path can be advantageously used in step e).

In an embodiment, the path used in step b) runs in clockwise direction around the vehicle when viewed from above. Alternatively, the path may be running anti-clockwise.

In an embodiment, an end of the path (an end position) is substantially identical to the start position.

In an embodiment, the positioning of the mobile communication device at the end position is communicated to the mobile communication device by a corresponding user input to the mobile communication device. This can be done in particular as explained above for similar communications concerning the start position and/or subsequently reached particular positions along the path around the vehicle.

Preferably, the steps b) and e) are executed at the latest when the end position of the path is reached.

In an embodiment, step d) and/or step e) is performed by the mobile communication device by means of a software-implemented algorithm executed on this device.

As an alternative, at least a part of a processing performed in step d) and/or step e) may be realized by another processing unit different from the mobile communication device (bearing in mind that in case of bidirectional communication capabilities, e.g. the measured signal strengths may be communicated to such other device, e.g. at least one of the wheel units).

In the case of a bidirectional communication between the mobile communication device on the one hand and the wheel units on the other hand, it is even possible to additionally measure RF signal strengths of RF signals sent from the mobile communication device to each of the wheel units and e.g. to communicate such signal strengths measured by each of the wheel units back to the mobile communication device. In this way, it would be possible in steps d) and e) to additionally take into account such signal strengths, e.g. by forming a mean value of the signal strengths of RF signals transferred in both directions.

In an embodiment of step e), the wheel units for which a shape and/or sharpness of peaks in the respective path-dependent signal strengths matches best an expected shape and/or sharpness are identified as the wheel units which are mounted at the wheels of the vehicle. In particular, if the path around the vehicle subsequently passes each of the vehicle's wheels, the wheel units can be suitably identified as being the wheel units for which the peaks are the sharpest peaks (e.g. based on a sharpness defined as a ratio between a peak amplitude and a peak width). Given this identification of the wheel units belonging to the vehicle (learning), the identifying of respective wheel mounting positions can be realized based on an expected order of appearance of the peaks. Thus, in an embodiment of step e) the mounting positions are identified based on an order appearance of peaks of the path-dependent measured signal strengths.

In an embodiment, each of the wheel unit communication means is suitable for bidirectional RF communication, wherein the method further comprises the step of:
f) storing a localization information comprising a result of step e) in at least one of the wheel units.

In a further embodiment, in a first step of the method, the localization information is retrieved from the at least one of the wheel units in which the localization information is stored by the mobile communication device. If there are more mobile communication devices used for a particular vehicle, another mobile communication device (one that has not been used for the method before) could read out the localization information.

In a further embodiment, each of the wheel unit communication means is further suitable for measuring RF signal strengths of received RF signals in course of the bidirectional RF communications, wherein the method further comprises the steps of:
g) performing a plurality of bidirectional RF communications each performed between wheel units belonging to different pairs of the wheel units of the vehicle,
h) measuring RF signal strengths of the bidirectional RF communications performed in step g),
i) storing a signal strength table information assigned to the localization information and representing the RF signal strengths measured in step h) depending on the identifications of the wheel units belonging to each of the respective pairs of the wheel units.

Advantageously, this allows for a detection whether a change of the mounted wheel units has happened or not, without necessarily conducting the steps a) to e) by means of the mobile communication device.

In a further embodiment, the method further comprises the steps of:
j) detecting standstills of the vehicle, and, in the event of a detected standstill for at least a predetermined standstill duration:
j1) repeating steps g) and h),
j2) comparing a result of repeated steps g) and h) with the previously stored signal strength table information, and in the event of a difference therebetween exceeding a predetermined threshold:
j3) invalidating the stored localization information.

Advantageously, in the event that a change happened in terms of the wheel units mounted at the vehicle, a previously stored localization information is automatically invalidated (e.g. deleted from the respective storage).

In a further embodiment, upon an invalidation of the stored localization information, an invalidation information is communicated to the mobile communication device. This communication may be realized by a direct RF communication from the respective wheel unit(s) to the mobile communication device or e.g. via the internet (in case that the mobile communication device is too far away from the vehicle), wherein the respective wheel unit (s) may use vehicle's means for internet access. To this end, such internet access means of the vehicle may be coupled to a vehicle-based receiver for receiving the RF signals from the wheel units.

According to a further aspect of the present invention, a wheel information system comprises
wheel units each mounted at one of a plurality of wheels of a vehicle, wherein each wheel is mounted at one of a plurality of predetermined wheel mounting positions of the vehicle, and wherein each of the wheel units comprises a wheel unit communication means suitable for sending an RF signal including a wheel information of the respective wheel and an identification of the respective wheel unit, and a mobile communication device suitable for receiving the RF signals from the wheel units and for measuring an RF signal strength of the received RF signals, wherein the system is suitable for performing an analysis of variations of the measured RF signal strengths of the received RF signals depending on a position of the mobile communication device along a path around the vehicle, when the mobile communication device is moved from a predetermined start position with respect to the vehicle along the path and receives the RF signals from the wheel units and measures the RF signal strengths of the received RF signals when moving along the path, and identifying the wheel units mounted at the wheels of the vehicle and identifying the wheel mounting positions belonging to these wheel units based on a result of the analysis.

The embodiments and specific details described herein for the method according to the first aspect of the invention can be provided, in a corresponding manner, individually or in any combination, as embodiments or specific details of the wheel information system according to the further aspect of the invention.

In a further embodiment, the mobile communication device is further suitable for performing the analysis and/or the identifying of the wheel units and the wheel mounting positions belonging to these wheel units based on the result of the analysis.

In a further embodiment, each wheel unit communication means is suitable for bidirectional RF communication.

According to a further aspect of the present invention, a computer program product comprises software code for performing the method according to the first aspect of the invention when the software code is run on a mobile communication device (e.g. a smartphone).

Figure 2:
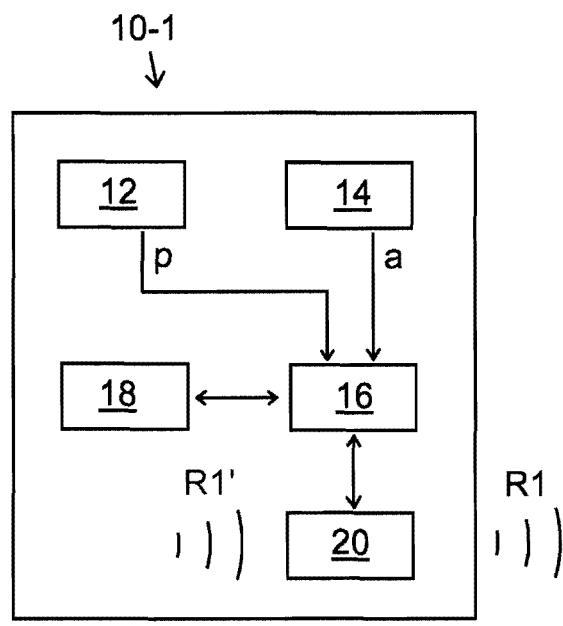
Figure 3:
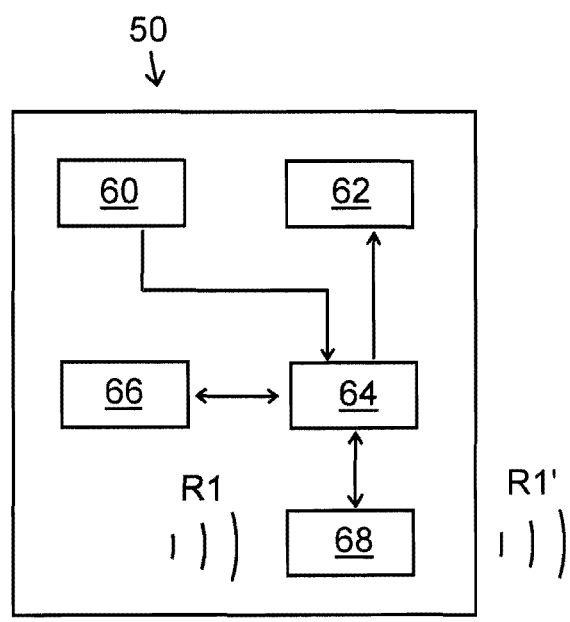
Figure 4:
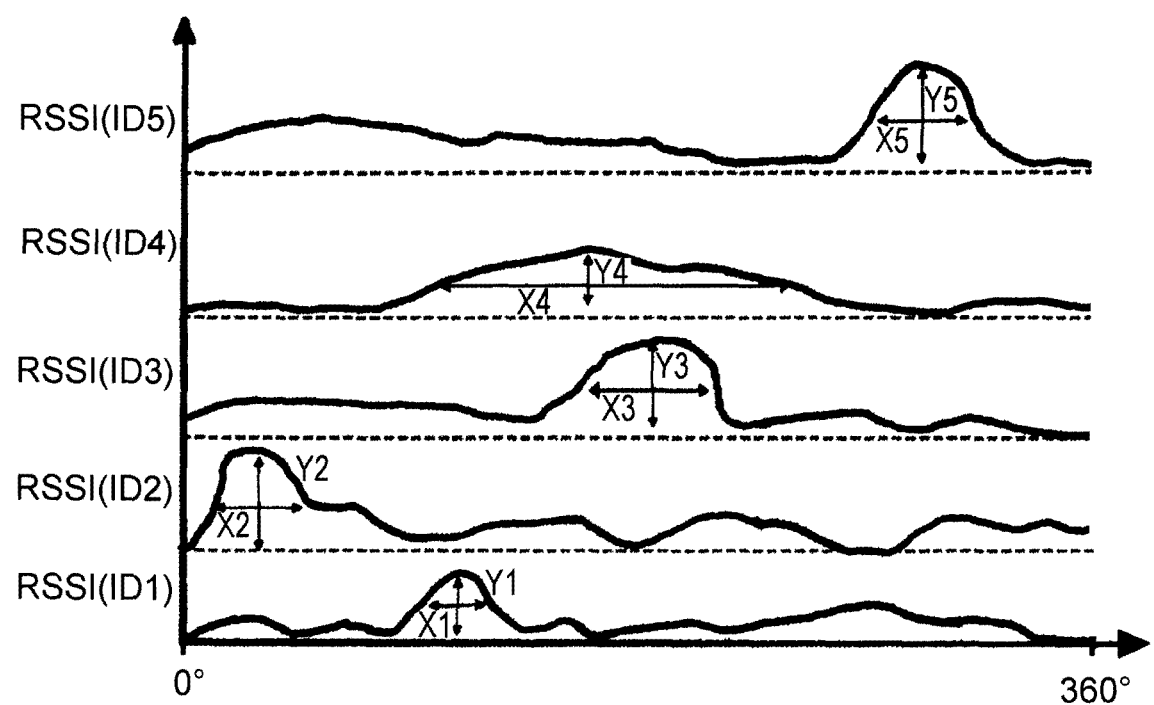
Figure 5:
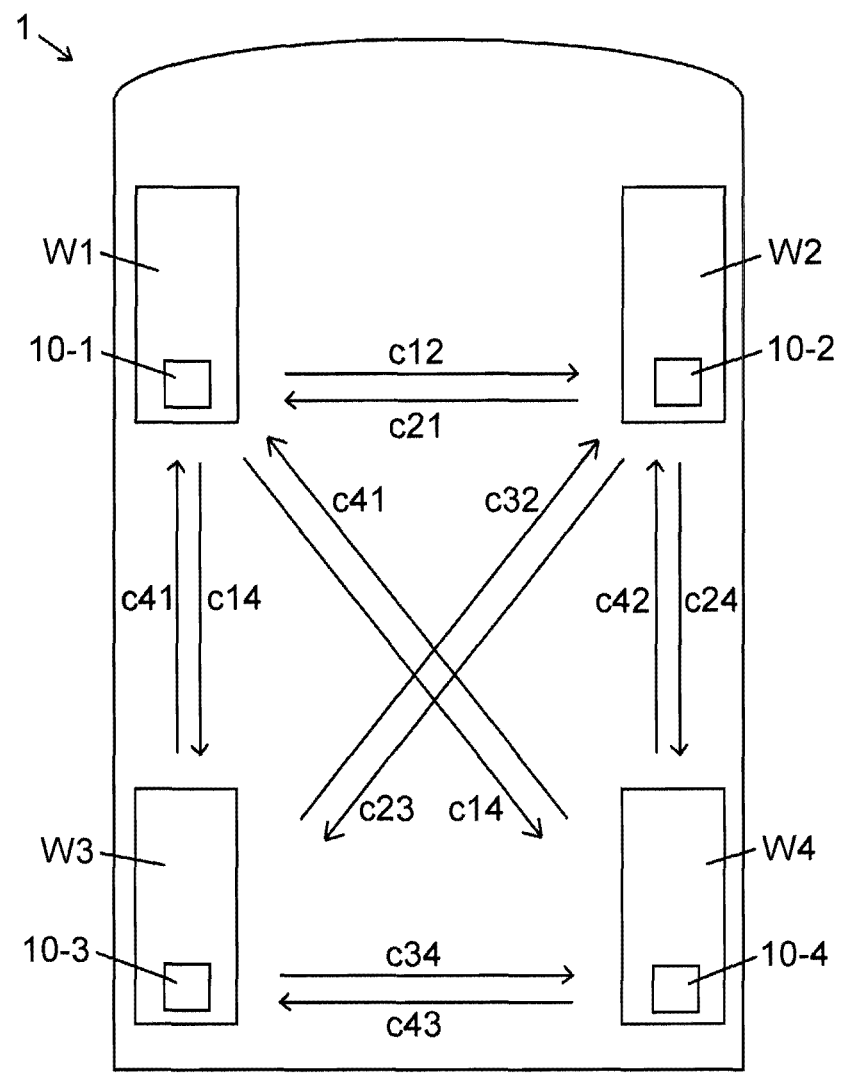

The invention will now be described in more detail by way of exemplary embodiments with reference to the accompanying drawings, wherein FIG. 1 illustrates a schematic top view of a vehicle equipped with a tire pressure monitoring system (TPMS), FIG. 2 illustrates a block diagram of one of the wheel units of the TPMS, FIG. 3 illustrates a block diagram of a user's smartphone that can be used in connection with the TPMS, FIG. 4 illustrates a diagram with measured signal strengths of RF signals received by the smartphone when moving the smartphone around the vehicle, and FIG. 5 illustrates another schematic top view of the vehicle, illustrating bidirectional RF communications each performed between wheel units belonging to different pairs of the wheel units.

FIG. 1 illustrates a vehicle 1 (here e.g. a passenger car) having four vehicle wheels W1 to W4 each mounted at one of a plurality of wheel mounting positions "front left" (FL), "front right" (FR), "rear left" (RL) and "rear right" (RR).

The wheels W1 to W4 each comprise a rim and a tire mounted onto the respective rim.

In the illustrated embodiment, each tire is equipped with an electronic wheel unit 10-1, 10-2, 10-3 or 10-4, respectively, wherein these wheel units 10-1 to 10-4 each are mounted for example at an inner side of a running surface of the respective tire. Alternatively, each of the wheel units may for example be mounted at the rim of the respective wheels, e.g. connected to respective valve devices of the e.g. air-filled tires.

The wheel units 10-1 to 10-4 are configured to detect at least one operational parameter of the respective wheel (e.g. the tire pressure of the respective wheel of the wheels W1 to W4) and to send (e.g. from time to time when the vehicle is driving) a respective RF signal (e.g. data telegrams) R1, R2, R3 or R4, respectively, containing information about one or more such operational parameter(s) of the respective wheel and an identification of the respective wheel unit to a vehicle-mounted central RF receiver 32. The receiver 32 is a component of an on-board electronics of the vehicle 1.

In the illustrated example, each of the wheel units 10-1 to 10-4 measures an air pressure in the respective air-filled tire as well as an acceleration at the location of the tire at which the wheel unit is mounted as such operational parameters. As the case may be, further operational parameters may be measured and/or derived from the result of a measurement of other physical quantities at the respective wheel by each of the wheel units 10-1 to 10-4. Based on the result of the measurements of air pressure and acceleration, each wheel unit 10-1 to 10-4 forms the respective signal of the signals R1 to R4, which signals are transmitted via RF (radio frequency) communication to the receiver 32 of the vehicle 1.

FIG. 2 illustrates a block diagram of the wheel unit 10-1. The other wheel units 10-2 to 10-4 have the same structure, so that a detailed description thereof is omitted to avoid repetition.

Referring to FIG. 2, the wheel unit 10-1 comprises a pressure sensor 12 for providing a sensor signal "p" representative of the air pressure in the tire of the wheel W1 and an acceleration sensor 14 for providing a sensor signal "a" representative of the acceleration at the mounting position of the wheel unit 10-1.

Further, the wheel unit 10-1 comprises a software-controlled processor 16 (e.g. a microcontroller) and an associated storage (e.g. a non-volatile RAM) for storing of software code and other data. These other data in particular comprise wheel type data related to the type of the wheel W1 at which the respective wheel unit 10-1 is mounted.

The processor 16 creates the signal R1 containing information about the actual tire pressure, the actual rotational speed of the wheel W1 and e.g. the actual tread contact length or footprint length of the respective tire. The latter operational parameters rotational speed and tread contact length or footprint length can be determined by the processor 16 based on an analysis of the acceleration sensor signal "a".

In the generation of the signal R1, as the case may be, the processor 16 may use not only the sensor signals "p" and "a" from the respective sensors 12 and 14, but also one or more data elements of the wheel type data stored in the storage 18. In this way, for example, the generated signal R1 may contain not only information about the respective operational parameter(s) as such, but also about the appropriateness of the detected operational parameter(s) for the actually mounted wheel W1. Furthermore, the signal R1 includes an identification of the wheel unit 10-1, typically a numerical ID code assigned to that wheel unit 10-1.

Further, the wheel unit 10-1 comprises a wheel unit communication means 20 (here a Bluetooth means) for RF transmitting the signal R1, which has been previously generated by the processor 16, to the receiver 32 of the vehicle 1.

For programming or re-programming of the wheel type data stored in the storage 18, e.g. by workshop personnel, an RF signal R1' may be transmitted by means of RF communication of the respective data to the wheel unit 10-1. In this case, the RF signal R1' is received by the wheel unit communication means 20 and transferred to the processor 16.

Referring again to FIG. 1, the RF signal R1 transmitted by the wheel unit 10-1, and accordingly the RF signals R2 to R4 transmitted by the wheel units 10-2 to 10-4, are received by the vehicle-mounted receiver 32 and communicated (e.g. via a digital data communication bus) to a central electronic control unit (ECU) which comprises a processor 34 (e.g. a microcontroller) and an associated storage 36 (e.g. a non-volatile RAM).

By means of a control software stored in the storage 36, the processor 34 accomplishes a plurality of control functions within the vehicle 1.

In particular, the receiver 32 and the electronic control unit on the one hand and the wheel units 10-1 to 10-4 on the other hand, form a tire pressure monitoring system (TPMS) 3. Apparently, the system 3 can be used to generate and output warnings e.g. in case of an excessive loss of tire pressure at any of the vehicle wheel W1 to W4.

The electronic control unit (comprising the processor 34 and the storage 36) together with the receiver 32 forms a receiving unit 30 of the vehicle 1. A key task of the receiving unit 30 is to identify which of all the ID codes it receives belongs to the vehicle 1 (and not to another vehicle in the proximity of vehicle 1) and moreover at which of the wheel mounting positions FL, FR, RL, RR of this vehicle 1 the wheel units sending these ID codes are located.

To this end, the electronic control unit additionally receives wheel speed sensor signals of wheel speed sensors (not shown) mounted at each of the wheels W1 to W4, so that the wheel information received via the signals R1 to R4 (and possibly similar RF signals from another vehicle) can be correlated with the additionally provided wheel speed sensor signals to statistically determine whether or not a particular wheel unit (identified by its ID code) belongs to the vehicle 1 or not, and where it is located at the vehicle 1 (if it belongs to that vehicle 1). This approach for realizing localization relies on the fact that in almost all driving situations of the vehicle 1, the wheel speeds and time-dependent wheel speed variations are more or less different for the four wheels W1 to W4.

The present invention addresses the above mentioned task also in the case that a mobile communication device not having access to information on the vehicle bus system shall communicate with wheel units of the vehicle.

This is illustrated in FIG. 1, showing a mobile communication device which in the illustrated embodiment is provided as a smartphone 50 suitable for receiving the RF signals R1 to R4 from the wheel units 10-1 to 10-4 via a Bluetooth connection between the smartphone 50 and the wheel units 10-1 to 10-4.

For example, the wheel units 10-1 to 10-4 are configured so that they can receive and process an RF signal from the respective mobile communication device (here the smartphone 50), which RF signal causes a wake-up of the wheel units 10-1 to 10-4 from a less energy consuming sleep state to an operational state.

In the illustrated example, a method for detecting the wheel units 10-1 to 10-4 mounted at a different one of the plurality of wheels W1 to W4 of the vehicle 1 and having the respective wheel unit communication means 20 suitable for sending the RF signal R1, R2, R3 or R4, respectively, including the wheel information of the respective wheel W1, W2, W3 or W4, respectively, and the respective ID code, wherein each wheel W1, W2, W3 and W4 is mounted at one of the plurality of the illustrated wheel mounting positions FL, FR, RL, RR, and for detecting the wheel positions belonging to each of the wheel units 10-1 to 10-4, comprises the steps of:

a) positioning the smartphone 50 suitable for receiving the RF signals R1 to R4 from the wheel units 10-1 to 10-4 and furthermore for measuring an RF signal strength of the received RF signals R1 to R4 at a predetermined start position 52 with respect to the vehicle 1, by a user carrying the smartphone 50, b) moving, by the user, the smartphone 50 from the start position 52 along a clockwise-orientated path 54 around the vehicle 1, c) receiving the RF signals R1 to R4 from the wheel units 10-1 to 10-4 and measuring the RF signal strengths thereof by the smartphone 50 when moving along the path 54 around the vehicle 1, d) performing an analysis of variations of the measured signal strengths of the received RF signals R1 to R4 depending on the position of the smartphone 50 along the path 54, e) identifying the wheel units 10-1 to 10-4 mounted at the wheels W1 to W4 and identifying the wheel mounting positions belonging to these wheel units 10-1 to 10-4 based on a result of the analysis.

FIG. 3 illustrates a block diagram of the smartphone 50, comprising input means 60 allowing user inputs from the user and output means 62 allowing outputs to the user. In the illustrated example, the input means 60 and the output means 62 are provided by a touch-sensitive display of the smartphone 50. Furthermore, the smartphone 50 comprises a software-controlled processor 64 and an associated storage 66 for storing software code and other data. The software code comprises an operation system for operating the smartphone 50 and an application code ("App") for realizing the above mentioned method for detecting the wheel units 10-1 to 10-4 and respective wheel mounting positions FL, FR, RL, RR. The application code in particular implements the above mentioned steps d) and e).

The processor 64 receives user inputs from the input means 60 and creates outputs for presentation by means of the output means 62.

Furthermore, the processor 64 is coupled to an RF communication means 68 suitable for a bidirectional RF communication, in the illustrated embodiment according to the Bluetooth standard.

The smartphone 50 thus can e.g. receive the RF signal R1 from the wheel unit 10-1 and can send e.g. the RF signal R1' for communicating data to the wheel unit 10-1. In this way, the smartphone 50 can also communicate bidirectionally with other wheel units within a certain radius (typically e.g. up to 15 meters away from the smartphone 50).

Referring again to FIG. 1, given the Bluetooth connections between the smartphone 50 and the wheel units in such surrounding, a field strength information called "RSSI" (Received Signal Strength Indicator) can be measured and thus associated with each of the available wheel units identified by their respective ID codes, i.e. RSSI(IDn), where "n" labels the wheel units. The key issue is then to track changes in RSSI(IDn) while moving the smartphone 50 along a specific (preferably predefined or predetermined) path 54.

In the illustrated embodiment, in step a) the user positions the smartphone 50 at the start position 52 near a front face (at the middle of that front face) of the vehicle 1 and confirms this positioning by a corresponding user input (e.g. by pressing a softkey on the touch-sensitive display of the smartphone 50).

Then, in step b) the user carrying the smartphone 50 walks from the start position 52 along the predetermined path 54 around the vehicle 1.

Simultaneously, in step c) the smartphone 50 receives the RF signals R1 to R4 and, for example, another RF signal R5 from another vehicle (not shown) in the surrounding, and measures the respective RF signal strengths, i.e. RSSI(IDn) for n=1 . . . 5.

In the course of steps b) and c), in particular positions along the path 54 reached by the user can be confirmed by respective user inputs to the smartphone 50 and/or automatically tracked by the use of position sensor means of the smartphone 50 for providing positional information (e.g. yaw/heading angle reaches 90°, 180°, 270° or 360°, respectively).

Once the path 54 is completed, the information RSSI (IDn) is available along the entire "circle" from 0° to 360°. This information is illustrated in FIG. 4.

FIG. 4 illustrates a diagram showing values of RSSI(ID1) to RSSI(ID5) depending on the position of the smartphone 50 along the path 54, wherein in the illustrated example, this position is represented by the respective angle in the range of 0° to 360° (360° corresponds to a complete encircling of the vehicle, e.g. when the smartphone 50 has reached again the start position).

In this example, in step c), the RSSI values of five distinct IDs 1 . . . 5 are monitored along the path 54. Each of these RSSI values shows a peak structure depending on the position (here: angle from 0° to 360°).

In step d), for each of the monitored RSSI values RSSI (ID1) to RSSI(ID5) an amplitude "Yn" and a width "Xn" of the respective peak structure is determined (in the illustrated embodiment: calculated in the smartphone 50), wherein "n" indicates the respective identification IDn. Further, in this example, based on the values Yn, Xn, a quality factor indicating a sharpness of the respective peak is determined e.g. as Qn=Yn/Xn calculated in step d).

In step e), the task of "learning" can be solved by identifying the four IDs with the highest quality factors Qn. In the example of FIG. 4, it is clear that ID4 has the lowest quality factor (Q4) and thus is excluded.

In step e), the task of "localization" can be solved by assigning the sequence of the remaining (i.e. learned) four IDs, i.e. ID2, ID1, ID3, ID5 (in this order, corresponding to the appearance of the respective peaks) to the sequence of the four wheel mounting positions in the order, in which the smartphone 50 passes these wheel mounting positions when moving along the specific (predefined) path 54, i.e. FR, RR, RL, FL. Consequently, in the illustrated example a localization information is determined as: FR-ID2, RR-ID1, RL-ID3, FL-ID5, or equivalently: wheel unit 10-1-FL, wheel unit 10-2-FR, wheel unit 10-3-RL, wheel unit 10-4-RR.

Thus, based on a result of the analysis of step d), in step e) the wheel units 10-1 to 10-4 (identified by ID5, ID2, ID3, ID1) mounted at the wheels W1 to W4 of the vehicle 1 are identified, and furthermore the wheel mounting positions FL, FR, RL, RR belonging to these wheel units are identified.

The illustrated method is user friendly and relies on a change analysis of the RF signal strength values (e.g. RSSI values according to Bluetooth standard) and is thereby immune to variations in an offset between absolute RSSI values. Besides this, the mobile communication device (e.g. the smartphone 50) can be configured to track (and as the case may be, also to guide) the user motion automatically to ensure that the actually followed path is appropriate (e.g. corresponds to the predetermined path). All available wheel units or IDs, respectively, are assessed only in context with each other, i.e. the most significant ones (e.g. assessed by means of a predetermined quality parameter for each ID) are considered for learning. The sequence of appearance of the respective number of IDs (e.g. four in case of four IDs of a four-wheeled vehicle) along the path is considered for localization. This makes the approach independent of field strength related differences between different vehicles and also different locations on the vehicle. By moving the mobile communication device along the path, one may achieve a kind of pseudo triangulation.

In the illustrated embodiment, after completion of step e), a localization information comprising a result of step e) is stored in each of the identified wheel units 10-1 to 10-4.

For each wheel unit, at least the wheel mounting position identified for that wheel unit is incorporated in the localization information to be stored in that wheel unit.

Advantageously, when the same smartphone 50 (or another mobile communication device) shall be used later to identify the wheel units 10-1 to 10-4 of the vehicle 1 and to perform the localization of that wheel units 10-1 to 10-4, the steps a) to e) may be omitted and instead of this, the localization information can be retrieved from the wheel units 10-1 to 10-4.

In the illustrated example, the localization information to be stored in the wheel units (e.g. distributed over the wheel units 10-1 to 10-4, or as identical copies in each of the wheel units 10-1 to 10-4) additionally comprises a signal strength table information assigned to the localization information and representing RF signals strengths measured by means of preferably bidirectional RF communications performed between wheel units belonging to different pairs of the wheel units 10-1 to 10-4 of the vehicle 1. This is illustrated in more detail in FIG. 5.

FIG. 5 illustrates a top view of the vehicle 1, showing the wheels W1 to W4 with the wheel units 10-1 to 10-4. For example, the wheel unit 10-1 can communicate with each of the wheel units 10-2 to 10-4, representing three different pairs of the wheel units. In the illustrated example of four wheel units 10-1 to 10-4, in total six different pairs of that kind exist. Assuming bidirectionality of all RF communications in these pairs, there exist in total 12 unidirectional communications c12, c21, c13, c31, c14, c41, c23, c32, c24, c42, c34, c43 as illustrated in FIG. 5.

Due to such (preferably bidirectional) communications between the wheel units 10-1 to 10-4, each wheel unit can measure one or more RSSI values of RF signals received from one or more of the other three wheel units. In the illustrated example, the RSSI values of all possible RF communications c12, c21, c13, c31, c14, c41, c23, c32, c24, c42, c34, c43 are measured for providing the signal strength table information.

Thus, a table of 12 RSSI values exists where always two of them shall match to one pair showing more or less the same value (i.e. for both directions of signal transfer between the respective two wheel units).

In the illustrated example, upon completion of step e) the following steps are performed:

g) performing six bidirectional RF communications c12, c21; c13, c31; c14, c41; c23, c32; c24, c42; c34, c43 each communication being performed between wheel units belonging to different pairs of the wheel units 10-1 to 10-4 of the vehicle 1, h) measuring RSSI values of the bidirectional RF communications performed in step g),
i) storing an RSSI table information assigned to the localization information and representing the RSSI values measured in step h) depending on the identifications ID1, ID2; ID1, ID3; ID1, ID4; ID2, ID3; ID3, ID4 of the wheel units belonging to each of the respective pairs of the wheel units 10-1 to 10-4,
j) detecting standstills of the vehicle 1, and in the event of a detected standstill for at least a predetermined standstill duration:
j1) repeating steps g) and h),
j2) comparing a result of repeated steps g) and h) (newly established RSSI table information) with the previously stored RSSI table information, and in the event of a significant difference therebetween:
j3) invalidating the stored localization information, and preferably communicating an invalidation information to the mobile communication device (e.g. the smartphone 50).

In summary, upon a successful localization by completion of step e), the wheel units 10-1 to 10-4 are triggered to generate a table for the 12 paired RSSI values. These RSSI values are monitored periodically or event based, e.g. in the event of a vehicle start after a detected standstill of the vehicle 1 for at least a predetermined standstill duration. A significant change in the RSSI value table causes an automatic invalidation of the localization information stored in the system (e.g. in each of the wheel units) and may request for a new localization procedure.

The TPMS 3 of the vehicle 1 can be considered as not only comprising the wheel units 10-1 to 10-4 and the vehicle-based receiving unit 30, but additionally at least one mobile communication device (e.g. the smartphone 50).

LIST OF REFERENCE SIGNS 1 vehicle
3 tire pressure monitoring system (TPMS)
W1 to W4 wheel
10-1 to 10-4 wheel unit
R1 to R4 RF signal
R1' RF signal
R5 RF signal
12 pressure sensor
14 acceleration sensor
16 processor
18 storage
20 wheel unit communication means
30 receiving unit
32 receiver
34 processor
36 storage
50 smartphone
52 start position
54 path
60 input means
62 output means
64 processor
66 storage
68 RF communication means

The invention claimed is:

1. A method for detecting wheel units each mounted at one of a plurality of wheels of a vehicle and each having a wheel unit communication means configured to send an RF signal including a wheel information of the respective wheel and an identification of the respective wheel unit, wherein each wheel is mounted at one of a plurality of predetermined wheel mounting positions of the vehicle, and configured to detect wheel mounting positions belonging to each of the wheel units, the method comprising the steps of:

a) positioning a mobile communication device configured to receive the RF signals from the wheel units and to measure an RF signal strength of the received RF signals, at a predetermined start position with respect to the vehicle,
b) moving the mobile communication device from the start position along a path around the vehicle,
c) receiving the RF signals from the wheel units and measuring the RF signal strengths of the received RF signals by the mobile communication device when moving along the path around the vehicle,
d) performing an analysis of variations of the measured RF signal strengths of the received RF signals depending on the position of the mobile communication device along the path,
e) identifying the wheel units mounted at the wheels of the vehicle and identifying the wheel mounting positions belonging to the wheel units based on a result of the analysis,
f) storing a localization information comprising a result of step e) in at least one of the wheel units,
g) performing a plurality of bidirectional RF communications each performed between wheel units belonging to different pairs of the wheel units of the vehicle,
h) measuring RF signal strengths of the bidirectional RF communications performed in step g),
i) storing a signal strength table information assigned to the localization information and representing the RF signal strengths measured in step h) depending on the identifications of the wheel units belonging to each of the respective pairs of the wheel units,
j) detecting standstills of the vehicle, and, in the event of a detected standstill for at least a predetermined standstill duration:
j1) repeating steps g) and h),
j2) comparing a result of repeated steps g) and h) with the previously stored signal strength table information, and in an event of a difference therebetween exceeding a predetermined threshold:
j3) invalidating the stored localization information.

2. The method according to claim 1, wherein the predetermined start position in step a) is at least one of close to a wheel of the plurality of wheels of the vehicle and close to a face of a plurality of faces of the vehicle.

3. The method according to claim 1, wherein the positioning of the mobile communication device at the predetermined start position in step a) is communicated to the mobile communication device by a corresponding user input to the mobile communication device.

4. The method according to claim 1, wherein the positioning of the mobile communication device at one or more particular positions in course of step b) is communicated to the mobile communication device by one or more corresponding user inputs to the mobile communication device.

5. The method according to claim 1, wherein the mobile communication device comprises position sensor configured to provide positional information about the position of the mobile communication device, and wherein the method further comprises positional tracking based on the positional information by the mobile communication device when moving along the path around the vehicle.

6. The method according to claim 1, wherein the mobile communication device comprises at least one of telephone and computer functionalities.

7. The method according to claim 1, wherein the analysis in step d) comprises an evaluation of peak positions of peaks of the path-dependent measured signal strengths.

8. A wheel information system, comprising
wheel units each mounted at one of a plurality of wheels of a vehicle, wherein each wheel is mounted at one of a plurality of predetermined wheel mounting positions of the vehicle, and wherein each of the wheel units comprises a wheel unit communication means configured to send an RF signal including a wheel information of the respective wheel and an identification of the respective wheel unit, and
a mobile communication device configured to receive the RF signals from the wheel units and for measuring an RF signal strength of the received RF signals,
wherein the system is configured to
perform an analysis of variations of the measured RF signal strengths of the received RF signals depending on a position of the mobile communication device along a path around the vehicle, when the mobile communication device is moved from a predetermined start position with respect to the vehicle along the path and receives the RF signals from the wheel units and measures the RF signal strengths of the received RF signals when moving along the path,
identify the wheel units mounted at the wheels of the vehicle and identifying the wheel mounting positions belonging to these wheel units based on a result of the analysis,
store a localization information comprising a result of identifying the wheel units mounted at the wheels of the vehicle and identifying the wheel mounting positions belonging to these wheel units based on a result of the analysis in at least one of the wheel units,
perform a plurality of bidirectional RF communications each performed between wheel units belonging to different pairs of the wheel units of the vehicle,
measure RF signal strengths of the bidirectional RF communications performed between wheel units belonging to different pairs of the wheel units of the vehicle,
store a signal strength table information assigned to the localization information and representing the measured RF signal strengths of the bidirectional RF communications performed between wheel units belonging to different pairs of the wheel units of the vehicle depending on the identifications of the wheel units belonging to each of the respective pairs of the wheel units,
detect standstills of the vehicle, and, in the event of a detected standstill for at least a predetermined standstill duration:
repeat performing plurality of bidirectional RF communications each performed between wheel units belonging to different pairs of the wheel units of the vehicle and measuring RF signal strengths of the bidirectional RF communications performed between wheel units belonging to different pairs of the wheel units of the vehicle,
compare the result of repeated plurality of bidirectional RF communications and measurements of RF signal strengths with the previously stored signal strength table information, and in the event of a difference therebetween exceeding a predetermined threshold: invalidate the stored localization information.

9. The wheel information system according to claim 8, wherein the mobile communication device is further configured to at least one of perform the analysis and identify the wheel units and the wheel mounting positions belonging to these wheel units based on the result of the analysis.

10. The wheel information system according to claim 8, wherein each wheel unit communication means is configured to communicate bidirectionally via RF.

11. The method according to claim 1, wherein the analysis in step d) comprises an evaluation of at least one of a shape and a sharpness of peaks of the path-dependent measured signal strengths.

12. A non-transitory computer readable medium containing program instructions for detecting wheel units, wherein execution of the program instructions by one or more processors of a computer system causes the one or more processors to carry out the steps of the method of claim 1.

* * * * *